United States Patent
Arora et al.

(10) Patent No.: US 12,096,875 B2
(45) Date of Patent: Sep. 24, 2024

(54) SYSTEM AND APPARATUS FOR PROVIDING COOKED FOOD

(71) Applicant: The Quaker Oats Company, Chicago, IL (US)

(72) Inventors: Vipin Arora, Delhi (IN); Rahul Sadashiv Kamble, Delhi (IN)

(73) Assignee: The Quaker Oats Company, Chicago, IL (US)

( * ) Notice: Subject to any disclaimer, the term of this patent is extended or adjusted under 35 U.S.C. 154(b) by 1015 days.

(21) Appl. No.: 16/781,431

(22) Filed: Feb. 4, 2020

(65) Prior Publication Data

US 2021/0235916 A1 Aug. 5, 2021

(51) Int. Cl.
| | |
|---|---|
| *A47J 27/16* | (2006.01) |
| *A23L 5/10* | (2016.01) |
| *A23L 7/143* | (2016.01) |
| *A47J 27/00* | (2006.01) |

(52) U.S. Cl.
CPC .............. *A47J 27/16* (2013.01); *A23L 5/19* (2016.08); *A23L 7/143* (2016.08); *A47J 27/002* (2013.01); *A47J 27/004* (2013.01); *A23V 2002/00* (2013.01)

(58) Field of Classification Search
CPC ........ A47J 27/16; A47J 27/002; A47J 27/004; A23L 5/19; A23L 7/143; A23V 2002/00
USPC .......... 99/275, 280, 281, 288, 290, 295, 326
See application file for complete search history.

(56) References Cited

U.S. PATENT DOCUMENTS

| | | | |
|---|---|---|---|
| 5,335,588 A | 8/1994 | Mahlich | |
| 5,476,033 A * | 12/1995 | Locati | A47J 31/40 99/287 |
| 5,611,262 A | 3/1997 | Rizzuto et al. | |
| 2005/0084594 A1 | 4/2005 | Boudreau et al. | |
| 2008/0152760 A1* | 6/2008 | SpadareGrant | A23L 7/101 426/590 |

FOREIGN PATENT DOCUMENTS

| | | |
|---|---|---|
| EP | 2988635 | 3/2016 |
| WO | 2014207621 | 12/2014 |

OTHER PUBLICATIONS

International Search Report and Written Opinion issued on Mar. 16, 2021 in PCT/US2020/064789.
International Preliminary Report on Patentability issued in PCT/US2020/064789 on Jul. 28, 2022.

* cited by examiner

*Primary Examiner* — Phuong T Nguyen
(74) *Attorney, Agent, or Firm* — Barnes & Thornburg LLP; G. Peter Nichols

(57) ABSTRACT

A system for providing cooked food includes at least one container that stores an uncooked food product for dispensing of an aliquot of the uncooked food product; a source of milk; a source of steam; a mixing chamber configured to receive the milk and steam to increase the temperature of the milk and to dispense heated milk so that the heated milk contacts the dispensed aliquot of uncooked food product to cook the food product.

17 Claims, 3 Drawing Sheets

SYSTEM AND APPARATUS FOR PROVIDING COOKED FOOD

A system and apparatus for providing cooked food is described. The system and apparatus provide an aliquot of uncooked food to be contacted with a source of milk at the appropriate temperature to properly cook the food.

BACKGROUND

Establishments like hotels, employee cafeterias, convenience stores and the like often seek to provide their patrons with a selection of food products including cooked food products. Those cooked food products may include foods such as oat, barley, buckwheat, and the like. Oftentimes the patrons desire to cook their food product with milk or milk-type products. It is a challenge to provide milk at an appropriate temperature to properly cook the food. For example, when the food product is oats, the minimum temperature of the liquid to properly cook the oats is about 85° C. Therefore, in the case of, for example, oatmeal, typically such establishments will provide precooked oatmeal which, over time gelatinizes and becomes rather thick. And, it is not cooked in milk; instead the patron is typically required to add milk (typically cold milk) after dispensing the cooked oatmeal.

To address those concerns, it would be desirable to provide a self-serve apparatus that provides a selected amount of food product that is cooked at the appropriate temperature with milk.

SUMMARY

In one aspect, a system for providing cooked food is described. The system includes at least one container that stores an uncooked food product from which an aliquot of the uncooked food product can be dispensed, a source of milk, a source of steam, and a mixing chamber configured to receive the milk and steam to heat the milk. The heated milk is dispensed from the mixing chamber and contacts the dispensed aliquot of uncooked food product to cook the food product. In some aspects, the uncooked food product and the heated milk are dispensed substantially simultaneously.

The uncooked food product may include any sort of food product for which a hot liquid is required or desired to properly cook the food. The food product may include but is not limited to oat, barley, buckwheat, powder or flaky grains, Rice-A-Roni type products, Upma, Poha, protein powder, macaroni and cheese and the like. For ease of description and understanding, the following will refer to oats (oatmeal) but one of skill will understand that any type of food product for which a hot liquid is required or desired to properly cook the food is contemplated. The aliquot of uncooked food product is in the range of 5 grams to about 60 grams.

The term "milk" as used in the following description refers to dairy and non-dairy milk. Dairy milk may include but is not limited to whole milk, 2%, 1%, skim or non-fat milk. Non-dairy milk includes soy, banana, coconut, hemp, almond, cashew, macadamia, oat, pea, rice, peanut, and the like.

In some aspects, the milk may be preheated to a temperature between about 50° C. to about 80° C. prior to mixing with steam. In some embodiments, the dispensed milk is at a temperature between about 85° C. to about 95° C. (i.e., the temperature of the milk after contact with the steam). In some embodiments, the mixing chamber receives the milk and steam simultaneously. The amount of milk delivered to the mixing chamber and thus dispensed may range from about 50 ml to about 250 ml.

The system may include a pump to move milk from the source of milk to the mixing chamber. In some instances, the pump delivers a predetermined amount of milk to the mixing chamber. In some aspects the pump may be a peristaltic pump.

In some embodiments, the system may include a source of water fluidly connected with the source of steam. The source of water may be associated with a pump to deliver a predetermined amount of water to the source of steam. The predetermined amount of water may range from about 1 ml to about 30 ml. The source of steam may be any suitable device capable of producing steam or superheated steam from water. In some aspects, the source of steam may be a boiler, thermoblock, thermocoil, or similar device. The source of steam may deliver from about 1 ml to about 10 ml of steam or superheated steam to the mixing chamber.

The following also provides a description of an apparatus for providing cooked food. The apparatus may include a housing having a front face and a receptacle receiving area that is configured to removably receive a receptacle. One or more selector switches may be provided on the front face to provide for a selection of food product for a user.

The apparatus may be in the form of a housing with four walls and may further include a front face that is moveable from closed position to an open position that exposes an interior of the housing. For example, the front face may be hinged to a wall of the housing. In one alternative, the housing may have three walls such that the side opposite the front face is open to provide access from the rear to components located within the housing The interior of the housing may include a container that stores an uncooked food product for dispensing of an aliquot of the uncooked food product to the receptacle receiving area. A conveyor may be provided to move an aliquot of the uncooked food product to the receptacle receiving area where it may be received by a receptacle provided in the receptacle receiving area.

The interior of the housing may include a source of milk. Alternatively, the source of milk may be external to the housing. The source of milk, whether it is provided in the interior of the housing or the exterior, may provide milk at a temperature between about 50° C. to about 80° C.

The interior of the housing includes a source of steam. The source of steam may be in fluid communication with a source of water. The source of water may provide a predetermined amount of water to the source of steam by gravity or a pump. The source of steam receives the predetermined amount of water and converts it to steam where it is delivered to a mixing chamber provided in the interior of the housing and mixes with the milk to increase the temperature of the milk to at least 85° C.

The heated milk at a temperature of at least 85° C. is dispensed to the receptacle receiving area where it contacts the aliquot of uncooked food, at a receptacle receiving area where a receptacle may be removably provided.

The apparatus may include a microcontroller that is configured to receive a signal from the one or more selector switches and to dispense the heated milk upon receipt of a signal received from the selector switch. The microcontroller may further provide signals to control the dispensing of the aliquot of the uncooked food, the delivery of water to the source of steam, the operation of the steam source, and the delivery of heated milk to the mixing chamber, In other aspects, a method of providing cooked food includes dispensing an aliquot of uncooked food from a container, providing a source of steam and a source of milk, mixing the steam with the milk to increase the temperature of the milk to a temperature of at least 85° C. and thereafter dispensing the heated milk so that it contacts the uncooked food. The method may be performed using the system or apparatus described above.

BRIEF DESCRIPTION OF THE DRAWINGS

The following description accompanies the drawings, all given by way of non-limiting examples that may be useful to understand how the described process and system may be embodied.

DESCRIPTION

Figure 1:
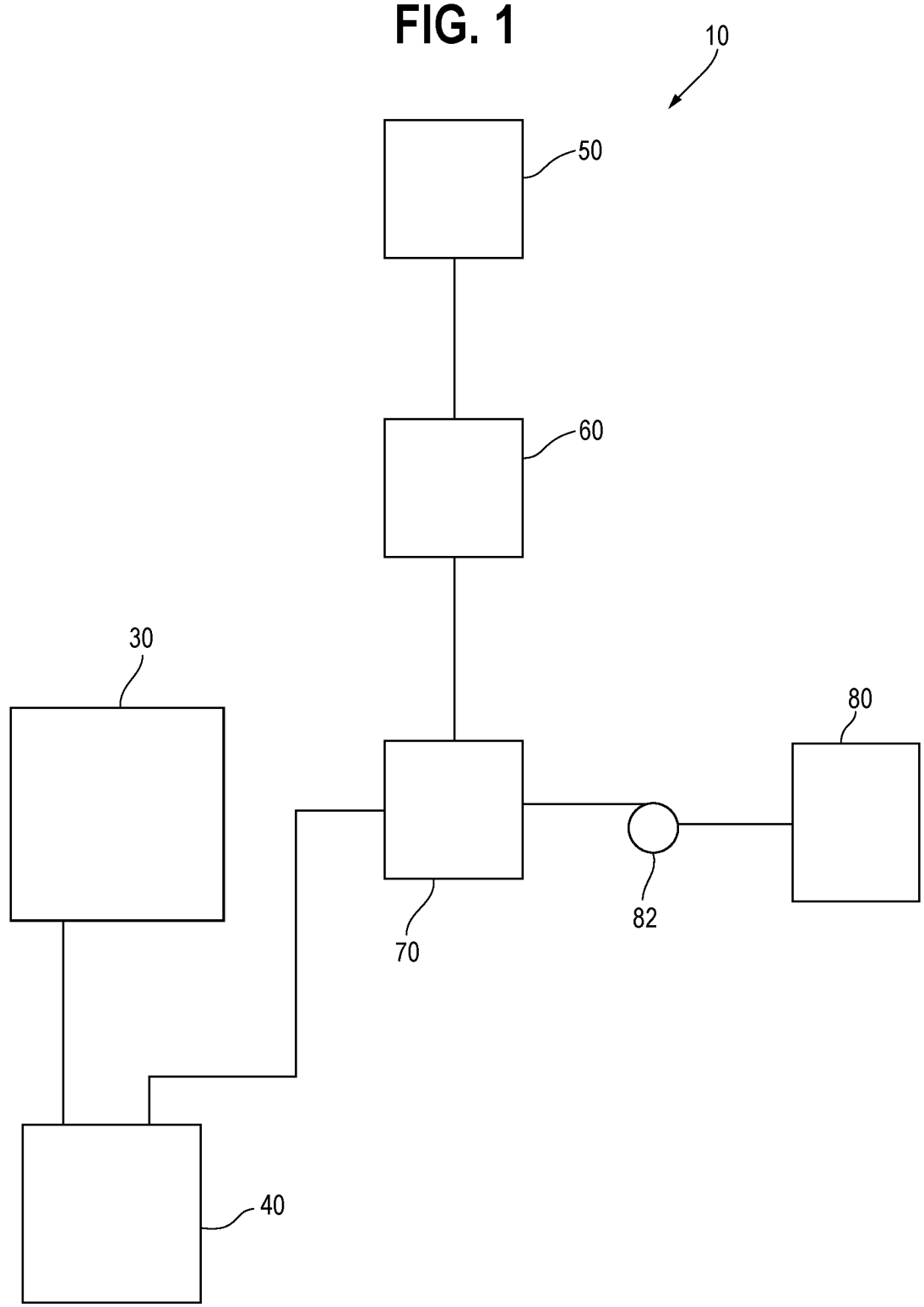
FIG. 1 schematically shows a system for providing cooked food.

Turning to FIG. 1, one embodiment of the system 10 for providing cooked food includes at least one container 30 that stores an uncooked food product for dispensing of an aliquot of the uncooked food product, a source of milk 80, a source of steam 60, and a mixing chamber 70 configured to receive the milk and steam and to increase the temperature of the milk. The heated milk is dispensed and contacts the dispensed aliquot of uncooked food product to cook the food product. In some aspects, the uncooked food product and the heated milk are dispensed substantially simultaneously. The system 10 may include a microcontroller 20 to control certain aspects of the system (see FIG. 3).

Figure 3:
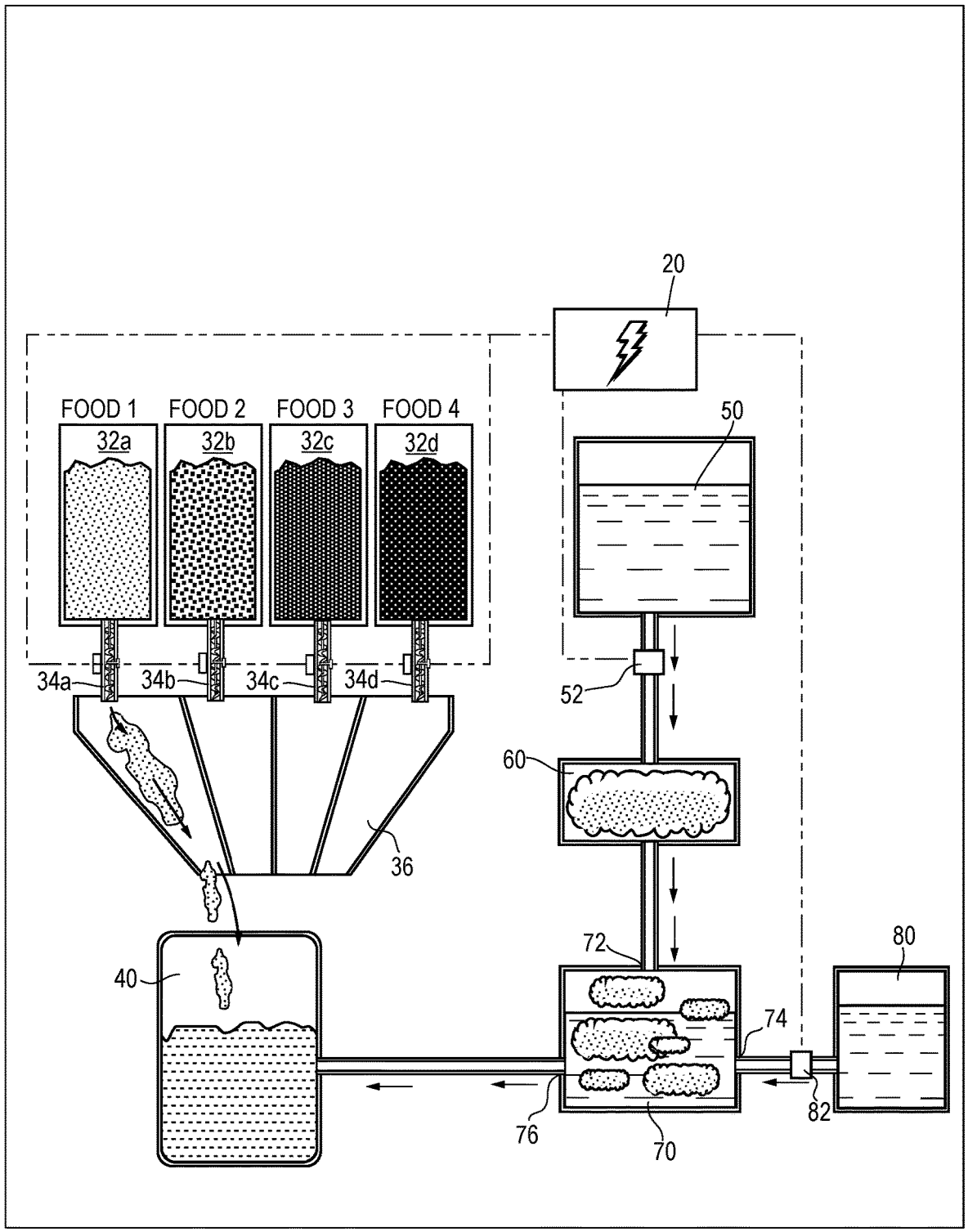
FIG. 3 schematically shows an apparatus for providing cooked food.

The container 30 may contain a single uncooked food product or it may contain more than one uncooked food product in one or more sub-containers 32a, 32b, 32c, 32d (see FIG. 3). While four sub-containers are depicted, it is contemplated that any number of sub-containers may be present.

As noted above, the uncooked food product may include any sort of food product for which a hot liquid is required or desired to properly cook the food. The food product may include, but is not limited to, oat, oatmeal, quick oats, barley, buckwheat, powder or flaky grains, Rice-A-Roni type products, Upma, Poha, protein powder, macaroni and cheese and the like, as well as mixtures of food product. For ease of description and understanding, the following description will refer to oats (oatmeal) but one of skill will understand that any type of food product for which a hot liquid is required or desired to properly cook the food is contemplated. Accordingly, where one or more sub-containers are provided each sub-container may store a single food product 32a, 32b, 32c, 32d or, if desired, may store a mixture of food products 32a, 32b, 32c, 32d.

The system may include a conveyor 34a, 34b, 34c, 34d (FIG. 3) to move an aliquot of the uncooked food product to be dispensed. Where more than one sub-container 32a, 32b, 32c, 32d is provided, a conveyor 34a, 34b, 34c, 34d may be associated with each sub-container 32a, 32b, 32c, 32d to move an aliquot of food product to be dispensed. The conveyor 34a, 34b, 34c, 34d may be any suitable apparatus that is configured to dispense the food product from the container. For example, the conveyor 34a, 34b, 34c, 34d may be a screw-type conveyor that will turn for a predetermined amount of time, which will then dispense a predetermined aliquot of the food product.

It is contemplated that a mixture of uncooked foods may be dispensed to the receptacle receiving area. For example, an aliquot of uncooked food from sub-container 32a may be simultaneously dispensed with an aliquot of uncooked food from sub-container 32d so that a mixture of food is dispensed and cooked.

The aliquot of uncooked food product is in the range of about 1 gram to about 100 grams, or from about 5 grams to about 60 grams, or from about 10 grams to about 50 grams, or about 20 grams to about 45 grams. In some instances, where the food product is oats, the aliquot may be in the range of about 30 grams to about 50 grams.

Additional ingredients may be included in the uncooked food products. Such ingredients may include flavoring agents, coloring agents, sweeteners, salt, vitamins, and minerals. Flavoring agents may include but are not limited to strawberry, chocolate, cinnamon, strawberry, banana, raisin, date, walnuts, peaches, apple, brown sugar, and mixtures thereof. Suitable sweeteners-artificial or natural—can be added in the food product to provide a desired sweetness. For example, brown sugar, maple sugar or fruit sugar can be used.

The system also includes a source of milk 80. As noted above, the milk can be from a dairy or non-dairy source. The dairy source may be from a mammal such as, but not limited to, a cow, water buffalo, goat, sheep, camel, donkey, horse, reindeer, and yak. Dairy milk may include but is not limited to whole milk, 2%, 1%, skim, or non-fat milk. Non-dairy milk includes, but is not limited to, soy, banana, coconut, hemp, almond, cashew, macadamia, oat, pea, rice, peanut milk, and the like.

The milk may be at ambient temperature or may be pre-heated to a temperature in the range from about 50° C. to about 80° C. The source of milk 80 may be associated with a heat exchanger or any other suitable heat source to either maintain the milk from the source of milk 80 at a temperature in the range from about 50° C. to about 80° C. or to modify the temperature of the milk from the source of milk 80 to a temperature in the range from about 50° C. to about 80° C. before it reaches the mixing chamber 70.

As an example, the source of milk 80 may be at ambient temperature and as the milk travels from the source of milk 80 to the mixing chamber 70, the milk may pass through a heat exchanger to modify the temperature of the milk from ambient temperature to a temperature in the range from about 50° C. to about 80° C. Alternatively, the source of milk 80 may be in the form of a container suitable to store milk and to modify or maintain the milk in the container at a temperature in the range from about 50° C. to about 80° C.

The milk, whether at ambient temperature or pre-heated, is provided to a mixing chamber 70, as more fully described below. The milk may be provided to the mixing chamber 70 by a pump 82 configured to deliver a predetermined amount of milk to the mixing chamber. The predetermined amount of milk is in the range from about 50 ml to about 250 ml, or from about 100 ml to about 200 ml, or from about 130 ml to about 150 ml and in some instances about 140 ml.

The pump 70 may any suitable pump that can provide a predetermined amount of milk. One suitable type of pump is a peristaltic pump.

The system 10 may also include a source of steam 60 that provides steam to the mixing chamber 70, as more fully described below. The source of steam 60 is in fluid communication with a source of water 50 and receives a desired amount of water. The source of water 50 may include, but is not limited to a container configured to store water and to deliver water to the source of steam 60. The source of water 50 may deliver water to the source of steam by gravity or by a pump. It is also contemplated that the source of water may be hard piped to a central source of water. Additionally, one or more valves or pumps (not shown) may be associated with the source of water to deliver and/or regulate the flow and amount of water delivered to the source of steam 60.

The source of water 50 may be at ambient temperature or may be heated. Alternatively, the water from the source of water 50 may pass through a heat exchanger to increase the temperature of the water prior to being supplied to the source of steam 60.

The source of water 50 supplies water to the source of steam 60 either by gravity or by a pump 52. A predetermined amount of water is supplied to the source of steam 60. The predetermined amount of water ranges from about 1 ml to about 30 ml, from about 2 ml to about 20 ml, or from about 5 ml to about 15 ml.

The source of steam 60 may be any apparatus that is configured to change the state of the water from a liquid to steam or superheated steam. The apparatus may be a boiler, a thermoblock, a thermocoil, or the like. In one aspect, the source of steam 60 provides a predetermined amount of steam to the mixing chamber at a temperature in the range from about 110° C. to about 150° C. or from about 120° C. to about 140° C. The predetermined amount of steam ranges from about 1 ml to about 10 ml or from about 2 ml to about 8 ml, or about 3 ml to about 6 ml, or about 4 ml to about 5 ml.

As noted above, a mixing chamber 70 is provided to receive the steam and the milk. The mixing chamber 70 is configured to receive the steam from an inlet 72 and the milk from a different inlet 74 spaced from the steam inlet 72. In one aspect, the inlets 72, 74 are orthogonal to each other so that as the milk enters the mixing chamber 70 it will be thoroughly mixed with the steam. In some aspects, the steam and the milk are delivered to the mixing chamber 70 substantially simultaneously. In some aspects, the temperature of the milk is increased to a minimum temperature of about 85° C. and typically in the range from about 85° to about 95° C. before it is dispensed from an outlet 76 and contacts the dispensed aliquot of uncooked food product.

The dispensed uncooked food product and the dispensed heated milk desirably contact each other at the receptacle receiving area 108 and, in some instances in a receptacle 40 located at receptacle receiving area 108 where the uncooked food is cooked by the heated milk. In some aspects, the uncooked food product and the dispensed heated milk are dispensed substantially simultaneously into a receptacle 40 (that is removably placed and removed from the receptacle receiving area 108) where they mix and the food product is cooked. Alternatively, the uncooked food product may be dispensed prior to the heated milk.

Figure 2:
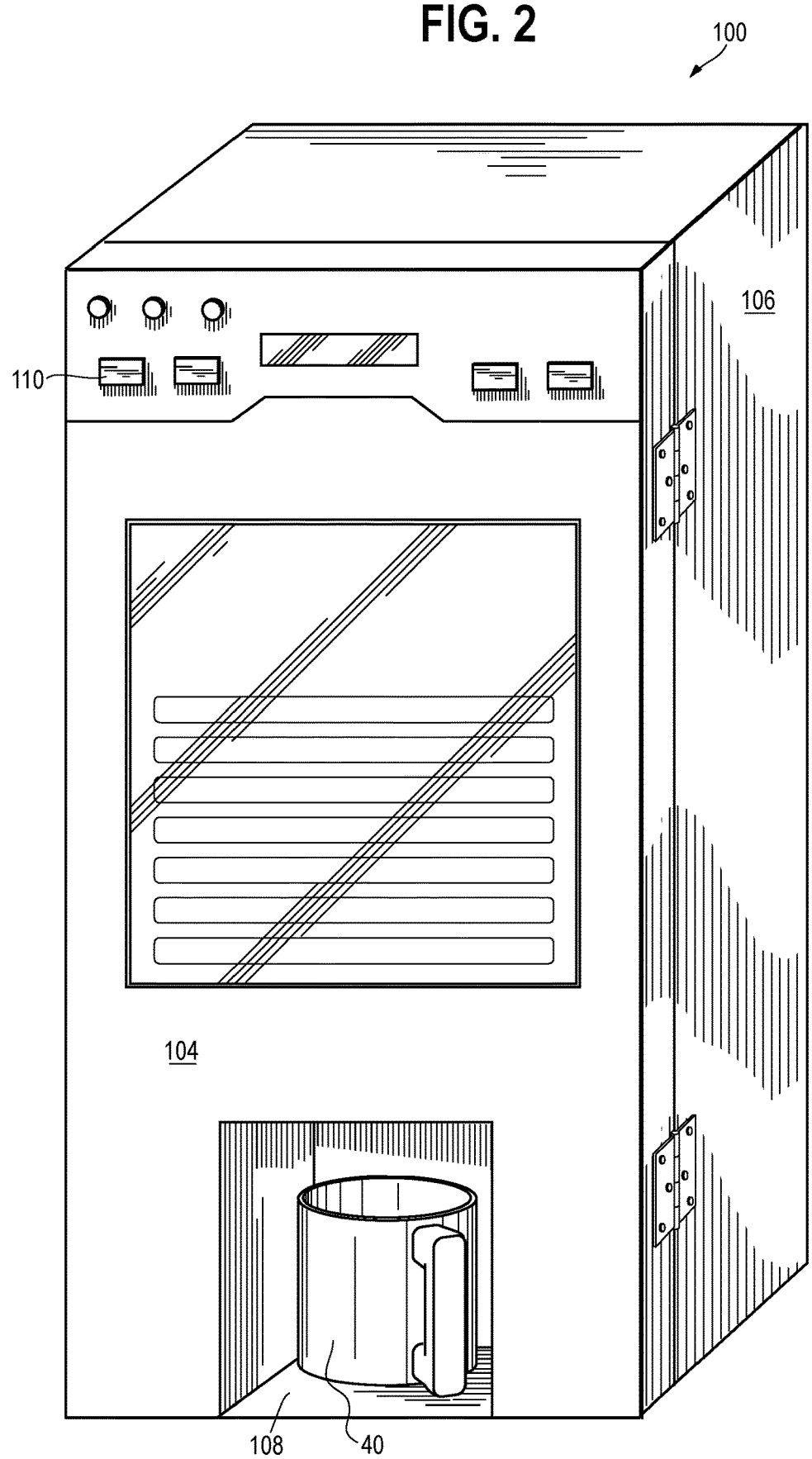
FIG. 2 shows a front face of an exemplary apparatus that can be used to provide cooked food.

Turning now to FIG. 2 an exemplary front face 104 of an exemplary apparatus 100 for providing cooked food is shown. FIG. 2 is described in connection with FIG. 3, which schematically shows one embodiment of the components that may be provided in the interior of the apparatus 100. One of skill will appreciate that the apparatus 100 may have many different configurations and that the figures and following description, including the figures and description of the front face 104, are merely one example of an apparatus 100 and front face 104 that may be suitable.

The apparatus 100 includes a housing 102 with a front face 104 that is hinged to at least one wall 106 of the housing 102 so that the front face 104 is capable of moving from a closed position to an open position that exposes an interior of the housing (not shown). The apparatus 100 also includes a receptacle receiving area 108 that is configured to receive a removable receptacle 40.

The housing 102 may have a wall opposite wall 106 and may have a wall opposite the front face 104 to define a rear wall. Alternatively, the housing 102 may not have a rear wall; rather the rear may be open.

The front face 104 may include one or more selector switches 110, which upon touching will send a signal to a microcontroller 20 (shown in FIG. 3). It is contemplated that only a single switch 110 be provided and that more than a single switch 110 be provided. The selector switch 110 may be any suitable type of switch such as a contact switch, a touch sensor or other biometric type switch, etc.

Additionally, while the selector switch(es) 110 are described as being located on the front face 104, one of skill will understand that this is merely referential and that the selector switch(es) may be provided on any suitable wall that would be convenient to the user. In some instances, a selector switch may be associated with one or more a sub-containers.

Referring now to FIG. 3, a container 30 is provided to store an uncooked food product. The container 30 may include one or more sub-containers 32a, 32b, 32c, 32d each containing different food products.

A conveyor 34a, 34b, 34c, 34d is associated with the container or with each sub-container 32a, 32b, 32c, 32d to dispense an aliquot of the food product. The conveyor 32a, 32b, 32c, 32d may be any suitable apparatus that is configured to dispense an aliquot of the food product. In one embodiment, the conveyor 32a, 32b, 32c, 32d may be a screw conveyor that receives a signal from the microcontroller 20 in response to depressing of the selector switch 110. The microcontroller 20 directs the screw conveyor to turn for a selected period of time to dispense a predetermined aliquot of the uncooked food product. The aliquot of food product may be moved by the conveyor to a chute 36, where the food product is dispensed to the receptacle receiving area 108.

As noted above, the aliquot of uncooked food product is in the range of about 5 grams to about 60 grams, or from about 10 grams to about 50 grams, or about 20 grams to about 45 grams. In some instances, where the food product is oats, the aliquot may be in the range of about 30 grams to about 45 grams.

At the same time or at substantially the same time, the microcontroller 20 sends a signal to the water source 50 to supply a predetermined quantity of water to the source of steam 60, where the water is converted to steam and delivered to the mixing chamber 70. The stored water may be at ambient temperature or may be heated. Alternatively, the stored water may pass through a heat exchanger to increase the temperature of the water prior to being supplied to the source of steam 60.

The water source 50 may be any suitable source of water but is typically a container that may be refilled either manually or automatically upon receipt of a low water amount signal. The source of water 50 may be delivered to the source of steam 60 either by gravity or by a pump 52. If the water is delivered by gravity, a valve (not shown) may be provided between the source of water 50 and the source of steam 60. The microcontroller 20 may send a signal to the valve so that the valve is opened for a predetermined amount of time to allow a predetermined amount of water to flow from the source of water to the source of steam.

Alternatively, the water may be delivered to the source of steam 60 by a pump 52. In this instance, the microcontroller 20 may send a signal to the pump 52, which will operate for a predetermined amount of time to deliver a predetermined amount of water to the source of steam 60.

The predetermined amount of water ranges from about 1 ml to about 30 ml, from about 2 ml to about 20 ml, or from about 5 ml to about 15 ml.

The source of steam 60 may be any apparatus that is configured to change the state of the water from a liquid to steam or superheated steam. The apparatus may be a boiler, a thermoblock, a thermocoil, or the like. In one aspect, the source of steam 60 provides a predetermined amount of steam to the mixing chamber 70 at a temperature in the range from about 110° C. to about 150° C. or from about 120° C. to about 140° C. The predetermined amount of steam ranges from about 1 ml to about 10 ml or from about 2 ml to about 8 ml, or about 3 ml to about 6 ml, or about 4 ml to about 5 ml.

In addition, at about the same time or at the same that the conveyer 32a, 32b, 32c, 32d is activated and the water is delivered to the source of steam 60, the milk delivery pump 82 is initiated and will operate for a selected period of time to deliver a selected amount of milk to the mixing chamber 70 where the temperature of the milk will be increased by contact with the steam. The pump 82 may any suitable pump that can provide a predetermined amount of milk. One suitable type of pump is a peristaltic pump. The predetermined amount of milk is in the range from about 50 ml to about 250 ml, or from about 100 ml to about 200 ml, or from about 130 ml to about 150 ml and in some instances about 140 ml.

The source milk 80 may be at ambient temperature or may be pre-heated to a temperature in the range from about 50° C. to about 80° C. The source of milk 80 may be associated with a heat exchanger or any other suitable heat source to either maintain the source of milk 80 at a temperature in the range from about 50° C. to about 80° C. or to modify the temperature of the milk from the source of milk 80 to a temperature in the range from about 50° C. to about 80° C. before it is delivered to the mixing chamber 70.

As noted above, the steam enters the mixing chamber 70 from one inlet 72 while the milk enters the mixing chamber 70 from another, separate, inlet 74, so that the milk and the steam are intimately mixed to increase the temperature of the milk. In some aspects, the steam inlet 72 and the milk inlet 74 are orthogonal to each other. After the temperature of the milk is increased, the heated milk is then delivered to the receptacle 40 as a result of the pressure of the steam and the flow of the milk driving the heated milk through the outlet 76 of the mixing chamber 70, where the heated milk contacts the aliquot of the food product, either before, at the same time as, or after the food product is delivered to the receptacle receiving area 108 so that the food product is cooked.

In other aspects, a method of providing cooked food includes dispensing an aliquot of uncooked food from a container, providing a source of steam and a source of milk, mixing the steam with the milk to increase the temperature of the milk to a temperature of at least 85° C. and thereafter dispensing the heated milk so that it contacts the uncooked food to cook the food. The method may be performed using the system or apparatus described above.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A system for providing cooked food comprising:
at least one container that stores solid food product;
a mechanical conveyor for moving an aliquot of the solid food product from the at least one container to a chute for dispensing the aliquot of the solid food product;
a source of milk;
a source of steam separate from the source of milk;
a mixing chamber having a first inlet, a second inlet separate from the first inlet, and a separate outlet, wherein each of the first inlet, second inlet, and outlet are in fluid communication with the mixing chamber, the mixing chamber being configured to receive the milk from the first inlet and steam from the second inlet, heat the milk, and dispense heated milk from the outlet;
wherein the dispensed heated milk contacts the dispensed aliquot of the solid food product to form the cooked food.

2. The system of claim 1 wherein the food product is oats.

3. The system of claim 1 wherein the milk is selected from a dairy or non-dairy milk.

4. The system of claim 3 where the non-dairy milk is selected from almond milk, soy milk, cashew milk, hemp milk, coconut milk, rice milk, pea milk, grain milk, nut milk.

5. The system of claim 3 where the milk is a dairy milk is selected from whole milk, 2%, 1%, or non-fat milk.

6. The system of claim 1 wherein the mixing chamber receives the milk and steam simultaneously.

7. The system of claim 6 wherein the mixing chamber receives the milk from a first inlet and receives the steam from a second inlet located orthogonal to the first inlet.

8. The system of claim 1 wherein the source of milk contains milk at a temperature in the range of about 50° C. to about 80° C.

9. The system of claim 1 wherein the source of steam includes steam at a temperature in the range of about 110° C. to about 150° C.

10. The system of claim 1 wherein the heated milk is at a temperature in the range of about 85° C. to about 95° C.

11. The system of claim 1 further comprising a pump to move the milk from the source of milk to the mixing chamber.

12. The system of claim 11 wherein the pump delivers from about 50 ml to about 250 ml of milk to the mixing chamber.

13. The system of claim 1 further comprising a source of water fluidly connected to the source of steam.

14. The system of claim 13 wherein the source of water provides from about 1 ml to about 30 ml of water to the source of steam.

15. The system of claim 1 wherein the source of steam includes a boiler, a thermoblock, or a thermocoil.

16. The system of claim 1 wherein the aliquot of the solid food product is in the range of about 5 grams to about 60 grams.

17. The system of claim 1 wherein the aliquot of the solid food product and the heated milk are dispensed substantially simultaneously to that the dispensed heated milk contacts the dispensed aliquot of the solid food product at substantially the same time.

* * * * *